United States Patent [19]
Cooley et al.

[11] Patent Number: 4,947,018
[45] Date of Patent: Aug. 7, 1990

[54] RETRACTING ROCKER UNIT

[75] Inventors: William H. Cooley, 40 St. Nicholas Drive, Shepperton, Middlesex; Ralph Hart, 70 Great Tattenhams, Epsom Downs, Surrey, KT18 5SD; Peter E. Harding, Ilfracombe, all of England

[73] Assignees: Harcross Engineering (Barnstaple) Limited, Devon; William H. Cooley, Middlesex; Ralph Hart, Surrey, all of England

[21] Appl. No.: 410,642

[22] Filed: Sep. 21, 1989

[30] Foreign Application Priority Data

Sep. 27, 1988 [GB] United Kingdom ................ 8822618

[51] Int. Cl.⁵ .............................................. B23K 11/30
[52] U.S. Cl. .................................... 219/86.25; 219/89
[58] Field of Search ................ 219/86.25, 86.33, 86.1, 219/89

[56] References Cited

U.S. PATENT DOCUMENTS

| | | | |
|---|---|---|---|
| 2,310,556 | 2/1943 | Strong | 219/86.33 |
| 2,314,099 | 3/1943 | Mikhalapov | 219/86.33 |
| 3,244,345 | 4/1964 | Johnson | 219/86.33 |

*Primary Examiner*—Clifford C. Shaw
*Attorney, Agent, or Firm*—Frishauf, Holtz, Goodman & Woodward

[57] ABSTRACT

A retracting rocker unit comprises a base 10 mounting a linkage 12 and a power unit 14 which cooperates with the linkage to move a welding electrode of clamping jaw from the position shown initially vertically and then to the right.

7 Claims, 1 Drawing Sheet

4,947,018

RETRACTING ROCKER UNIT

BACKGROUND OF THE INVENTION

This invention is concerned with a retracting rocker unit.

Retracting rocker units are extensively used in, for example, the car industry in welding operations. A welding head is controlled by the rocker unit to move into position to effect a welding operation on say a panel and then to withdraw to allow the welded panel to be removed and a fresh panel substituted. The movement of the welding head in space is important as in the region of the panel it should be substantially perpendicular to the panel to ensure a good clamping force for welding while the main component of movement away from the panel should be at right angles to the previous movement so that the welding head clears the edge of the panel to allow the panel to be withdrawn and the new panel inserted.

A common retracting unit achieves this movement by mounting the welding head on a linkage system which incorporates a cam track in which a cam follower is moved by a pneumatic cylinder assembly, the intersection of the substantially linear movement of the follower and the shaped cam track producing the desired movement.

This arrangement does however have the disadvantage that the welding spatter tends to find its way onto the cam track and interferes with the movement of the cam follower.

Moreover there is heavy wear of the cam track because of the necessarily high angle of incidence of the thrust of the cam follower on the track.

It is an object of the present invention to provide an improved retracting rocker unit which obviates or mitigates these problems and produces a smooth controlled action.

SUMMARY OF THE INVENTION

The present invention is a rocker unit comprising a support having three fixed pivots, a tool head having two pivots thereon and having at one side thereof a tool, a first support link extending between one pivot point on the head adjacent the tool and one fixed pivot on the support, a second support link connected at one end to the other pivot point on the head, a first control link connected to the one fixed pivot and a pivot at the other end of the second support link, a second control link connected between a second fixed pivot on the support and a pivot intermediate the ends of the second support link, a power unit connected to the third fixed pivot on the support and with a link such that operation of the unit from one extreme position causes substantially axial movement of the second support link.

BRIEF DESCRIPTION OF THE DRAWINGS

Embodiments of the present invention will now be described, by way of example, with reference to the accompanying drawings, in which.

DETAILED DESCRIPTION

Figure 1:
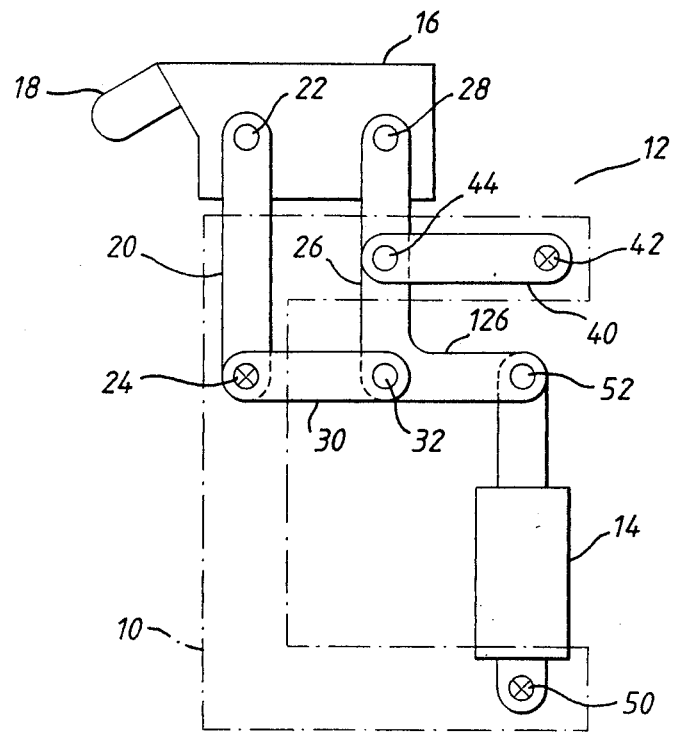
FIG. 1 diagrammatically illustrates a first embodiment of the present invention.

Referring now to FIG. 1 a retracting rocker unit is shown comprising a base 10 mounting a linkage 12 and a drive unit 14, in this embodiment a pneumatic cylinder, a tool head 16 being mounted on the linkage 12. In this embodiment the tool head 16 is a welding head mounting a welding electrode 18 and it is shown in the welding position in FIG. 1.

The linkage 12 includes a first support link 20 extending between a pivot 22 on the head 16 adjacent the tool or electrode 18 and a first pivot 24 on the base 10. A second support link 26 extends substantially parallel to the first support link 20 and is connected to the head 16 by a second pivot 28. A first control link 30 extends between the fixed pivot 24 on the base and a pivot 32 on the link 26. The link 30 thus constrains the pivot 32 to move in an arc centered on the pivot 24, initial movement of the pivot 32 being in the direction of the axis of the link 26.

A second control link 40 extends between a second fixed pivot 42 on the base 10 and a pivot 44 on the link 26 intermediate the pivots 28 and 32. The link 40 constrains the pivot 44 to move in an arc centered on the pivot 42, the initial movement of the pivot 44 being in the direction of the axis of the link 26.

The drive unit 14 is connected between a third fixed pivot 50 on the base and a pivot 52 on link 126 which together with the link 26 forms a bell crank lever pivoted on 32.

From the welding position shown, the drive unit 14 is operated to move the pivot 52 down this causing the bell crank lever 26/126 also to move down. As the pivots 32 and 44 are constrained to move initially in the direction of the axis of the link 26, i.e. vertically down as seen in FIG. 1, the link 26 initially moves axially to cause the pivot 28 to move down and rotate the head 16 clockwise about the pivot 22. Thus the initial movement of the welding electrode 18 is vertically up as it pivots about the pivot 22.

These initial movements quickly change however as the drive unit pulls the pivot 52 down. The pivot 32 begins to move to the left as seen in FIG. 1 while the pivot 44 begins to move to the right, these two movements reinforcing each other to cause a significant movement of the pivot 28 to the right, which movement is accomodated by a pivoting of the support link 20 about the fixed pivot 24. Thus the head 16, while continuing to rotate about the pivot 22 is also moving to the right and down on an arc centered on the pivot 24.

Thus following the initial vertical movement of the electrode 18, comes a major component of movement to the right as is desired to remove the electrode 18 from above (as seen in FIG. 1) the workpiece and allow the old workpiece to be removed and a new workpiece inserted. The closing movement of the electrode 18 onto the new workpiece is of course the reverse of the movement described above.

It should of course be understood that while the various elements of the linkage have been referred to in the singular, each "link" could consist of parallel members extending on either side of a connecting link.

It should also be noted that the various pivots are by their nature protected against welding spatter and thus jamming of the linkage of the present invention is much less common than linkages of the prior art.

The embodiment of FIG. 1 occupies rather more space vertically (as seen in the drawing) than horizontally and of course the design of the support for the panel being welded may be such that the necessary space is simply not available. To overcome this an embodiment is shown in FIG. 2 which occupies rather more space horizontally than vertically.

Figure 2:
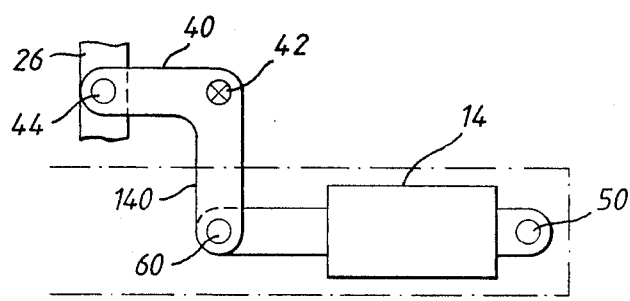
FIG. 2 illustrates a modified embodiment.

In FIG. 2 the simple link 40 of FIG. 1 is changed to a bell crank lever 40/140, the drive unit 14 being connected to the pivot 60 at the free end of the bell crank. The remainder of the linkage etc. of FIG. 2 is the same as shown in FIG. 1 except that the bell crank 26/126 is no longer required and a simple link 26 would be all that is necessary.

The operation of FIG. 2 is essentially the same as that of FIG. 1, initial operation of the unit 14 causing the bell crank to rotate anti-clockwise about the pivot 42 thus moving the link 26 axially downward. The intersection of the links is then the same as described for FIG. 1.

Thus it can be seen that by selecting suitable connecting positions the cylinder 14 can be mounted in any position desired to suit the application from vertically down (FIG. 1) through horizontal (FIG. 2) to vertically up. This is not possible in rocker units presently available.

The precise locus followed by the electrode 18 is of course dependent upon the various link lengths, in particular the lengths 24–32, 44–28, 44–42 and 44 to 32.

The embodiment described may be modified by substituting a clamping jaw for the welding head described.

We claim:

1. A rocker unit for moving a tool between two extreme positions, the tool having from either position an initial movement in one direction and a final movement in another direction at substantially right angles to said one direction, the rocker unit comprising:
   a support having three fixed pivots,
   a tool head having to pivot points thereon and having at one side thereof a tool,
   a first support link extending between one of said pivot points on the tool head adjacent the tool and one of said fixed pivots on the support,
   a second support link connected at one end to the other of said pivot points on the tool head,
   a first control link connected to said one fixed pivot on the support and to a pivot at the other end of the second support link,
   a second control link connected between a second of said fixed pivots on the support and a pivot intermediate the ends of the second support link,
   a power unit connected to the third of said fixed pivots on the support and with a link such that operation of the power unit from one of said extreme positions initially causes substantially axial movement of the second support link and rotation of the tool head about the one pivot point, the control links affecting subsequent movement of the second support link to cause the head to thereafter move bodily at substantially right angles to the inital axial movement.

2. A rocker unit is claimed in claim 1, in which the power unit is connected to one arm of a bell crank lever the, another arm of which is said link with which the power unit is connected.

3. A rocker unit as claimed in claim 2, in which the link with which the power unit is connected is the second support link.

4. A rocker unit as claimed in claim 3, in which the power unit is an air cylinder and piston.

5. A rocker unit as claimed in claim 4 in which the tool head is welding head.

6. A rocker unit as claimed in claim 2, in which the link with which the power unit comprises connected is the second control link.

7. A rocker unit as claimed in claim 1, in which the tool head is a clamping jaw.

* * * * *